United States Patent
Kol (10) Patent No.: US 10,769,367 B1
(45) Date of Patent: Sep. 8, 2020

(54) LOW-LATENCY INTERACTIVE USER INTERFACE

(71) Applicant: Google LLC, Mountain View, CA (US)

(72) Inventor: Tomer Kol, Yoqneam, IL (US)

(73) Assignee: Google LLC, Mountain View, CA (US)

( * ) Notice: Subject to any disclaimer, the term of this patent is extended or adjusted under 35 U.S.C. 154(b) by 1110 days.

(21) Appl. No.: 15/076,168

(22) Filed: Mar. 21, 2016

Related U.S. Application Data (63) Continuation of application No. 12/961,591, filed on Dec. 7, 2010, now Pat. No. 9,323,722.

(51) Int. Cl.
| | |
|---|---|
| *G06F 3/0481* | (2013.01) |
| *G06F 40/205* | (2020.01) |
| *H04L 12/58* | (2006.01) |
| *G06F 40/166* | (2020.01) |
| *G06F 3/0489* | (2013.01) |
| *G06F 40/226* | (2020.01) |

(52) U.S. Cl.
CPC .......... *G06F 40/205* (2020.01); *G06F 3/0481* (2013.01); *G06F 3/04895* (2013.01); *G06F 40/166* (2020.01); *H04L 51/18* (2013.01); *G06F 40/226* (2020.01)

(58) Field of Classification Search
CPC ..... G06F 17/20–212; G06F 17/24–248; G06F 17/27–2795; G06F 3/048–0481; G06F 3/0482; G06F 3/0484–04847; G06F 3/04883
See application file for complete search history.

(56) References Cited

U.S. PATENT DOCUMENTS

| | | |
|---|---|---|
| 6,009,459 A | 12/1999 | Belfiore et al. |
| 7,548,915 B2 | 6/2009 | Ramer et al. |

(Continued)

FOREIGN PATENT DOCUMENTS

WO 0011571 3/2000

OTHER PUBLICATIONS

Melman, H., "Quicksilver User Manual," (Jan. 2009), pp. 1-127, Retrieved from, http://mysite.verizon.net/hmelman/Quicksilver.pdf (retrieved Oct. 23, 2012).

*Primary Examiner* — Matthew Ell
*Assistant Examiner* — Linda Huynh
(74) *Attorney, Agent, or Firm* — Fish & Richardson P.C.

(57) ABSTRACT

Methods, systems, and apparatus, including computer programs encoded on a computer storage medium, for a low latency interactive user interface. In one aspect, a method includes while individual characters in a sequence of characters are being entered into a field of an interactive user interface and before the sequence has been completely entered parsing the entered characters using a string pattern and presenting the parsed characters in a second field according to a presentation format. The method also includes sending one or more of the entered characters to a server. The method also includes receiving a different second string pattern and a different second presentation format from the server in response to the sending. The method also includes parsing one or more second entered characters using the second string pattern and presenting the parsed second entered characters in the second field according to a second presentation format.

12 Claims, 6 Drawing Sheets

(56) References Cited

U.S. PATENT DOCUMENTS

| | | |
|---|---|---|
| 7,596,568 B1 | 9/2009 | McConnell |
| 8,332,748 B1 | 12/2012 | Karam |
| 9,286,935 B1 * | 3/2016 | Wilder .................. G06F 40/211 |
| 2002/0003453 A1 | 1/2002 | Lazaridis et al. |
| 2003/0048287 A1 | 3/2003 | Little et al. |
| 2003/0069880 A1 | 4/2003 | Harrison et al. |
| 2004/0024842 A1 | 2/2004 | Witt |
| 2004/0085162 A1 | 5/2004 | Agarwal et al. |
| 2004/0128138 A1 | 7/2004 | Andrews et al. |
| 2004/0199499 A1 | 10/2004 | Lazaridis et al. |
| 2005/0108267 A1 | 5/2005 | Gibson et al. |
| 2005/0198563 A1 | 9/2005 | Kristjansson |
| 2006/0015591 A1 | 1/2006 | Datla et al. |
| 2006/0206454 A1 | 9/2006 | Forstall et al. |
| 2007/0016614 A1 | 1/2007 | Novy |
| 2007/0050351 A1 | 3/2007 | Kasperski et al. |
| 2007/0088686 A1 | 4/2007 | Hurst-Hiller et al. |
| 2007/0162422 A1 | 7/2007 | Djabarov |
| 2007/0214122 A1 | 9/2007 | Bala |
| 2007/0244976 A1 | 10/2007 | Carroll et al. |
| 2008/0162447 A1 * | 7/2008 | Ritter .................... G06F 40/284 |
| 2008/0222256 A1 | 9/2008 | Rosenberg et al. |
| 2008/0301581 A1 | 12/2008 | Baek et al. |
| 2009/0006079 A1 * | 1/2009 | Van Caldwell ....... G06F 40/284 704/9 |
| 2009/0249253 A1 | 10/2009 | Mercer |
| 2009/0292527 A1 * | 11/2009 | Anderson ............. G06F 40/274 704/9 |
| 2010/0161661 A1 | 6/2010 | Hood et al. |
| 2011/0106779 A1 | 5/2011 | George et al. |
| 2011/0179126 A1 | 7/2011 | Wetherell et al. |
| 2012/0016678 A1 * | 1/2012 | Gruber .................... G10L 15/22 704/275 |
| 2012/0192096 A1 | 7/2012 | Bowman et al. |
| 2012/0216140 A1 | 8/2012 | Smith |
| 2012/0240062 A1 | 9/2012 | Passmore et al. |

\* cited by examiner

LOW-LATENCY INTERACTIVE USER INTERFACE

CROSS-REFERENCE TO RELATED APPLICATIONS

This application is a continuation application of, and claims priority to, U.S. patent application Ser. No. 12/961,591, titled "Low-Latency Interactive User Interface," filed on Dec. 7, 2010. The disclosure of the foregoing application is incorporated herein by reference in its entirety for all purposes.

BACKGROUND

This specification relates to digital data processing and, in particular, to improving the responsiveness of interactive user interfaces.

Users can measure the responsiveness of a software application's user interface based on an amount of time between when the user executes an action by way of the user interface and when the user interface acknowledges the action. The responsiveness can be affected by many factors. For a user interface of a client application where the client and the server are in different locations, communication latency between the client and the server can greatly affect the apparent responsiveness of a user interface. The time it takes to communicate between a client and a server can be influenced by the distance between the client and the server as well as the medium over which the communication takes place (for example, fiber optic cable, copper wire, radio waves, etc. . . .)

SUMMARY

In general, one innovative aspect of the subject matter described in this specification can be embodied in methods that include the actions including while individual characters in a sequence of characters are being entered into a first field of an interactive user interface on a client device and before the sequence has been completely entered, performing by the client device: parsing one or more first entered characters using a first string pattern and presenting the parsed first entered characters in a second field of the interactive user interface according to a first presentation format; sending one or more of the entered characters to a server; receiving a different second string pattern and a different second presentation format from the server in response to the sending; and parsing one or more second entered characters using the second string pattern and presenting the parsed second entered characters in the second field of the interactive user interface according to a second presentation format. Other embodiments of this aspect include corresponding systems, apparatus, and computer programs, configured to perform the actions of the methods, encoded on computer storage devices.

These and other embodiments can each optionally include one or more of the following features. Receiving the first string pattern and the first presentation format from the server. The first field and the second field can be the same. The first field and the second field can be different. The input sequence can represent a command to send an email message. The string pattern can be one or more regular expressions. The one or more second entered characters can include the first entered characters.

Particular embodiments of the subject matter described in this specification can be implemented so as to realize one or more of the following advantages. The user interface provides rapid feedback to the user. Computational resources on a device executing the user interface are used efficiently. Latency may be decreased without executing the entire application on the device. The data set present on the device may be minimized, thereby improving privacy and security. Allows to offloads model based processing from the server to the device running the user interface even when it is not feasible or desirable to have all models on that device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
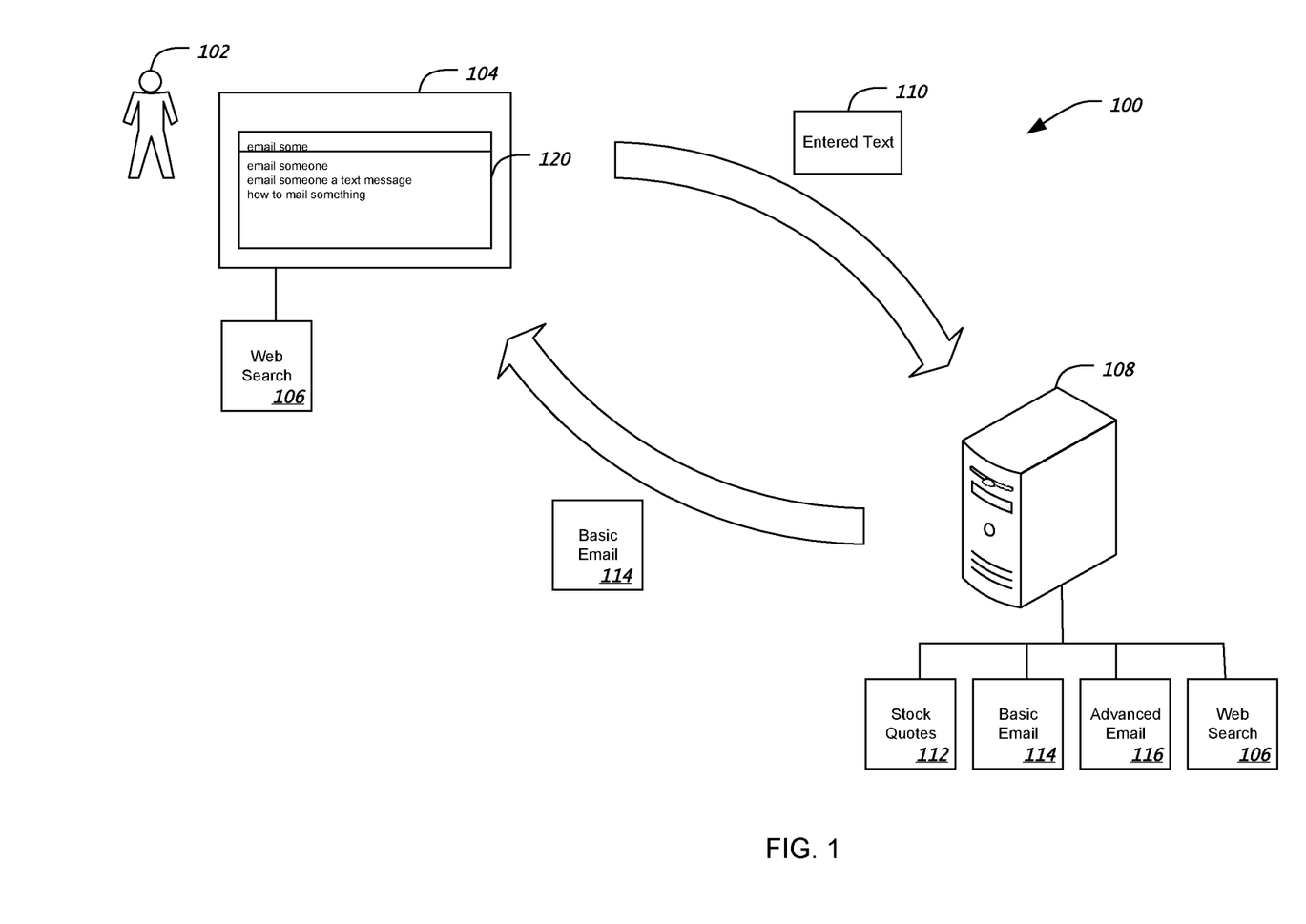
FIG. 1 is a block diagram illustrating an example environment in which a responsive user interface is used.

FIG. 1 is a block diagram illustrating an example environment in which a responsive user interface is used. A user 102 interacts with a client device 104 such as a personal computer, a laptop computer, or a smart phone that provides an interactive, graphical user interface 120 (e.g., on a display device). The user interface 120 can be, for example, an HTML page rendered in a web browser or an independent application running on the client device 104. The user interface 120 is capable of supporting multiple functions through an input field. For example, the user interface 120 can cause a process on a server to search the web, look up stock quotes, send email, send Short Message Service (SMS) messages, and other functions. To perform the functions, the user interface sends a request, for example, a Hypertext Transfer Protocol (HTTP) request, over a network to the server 108. The server 108 performs the functions on behalf of the client device 104. Results obtained by the server 108 are sent to the client device 104 in a response, for example, an HTTP response. In some implementations, the client device 104 sends input to the server 108 on a sending channel while listening for models on a listening channel (for example, an HTML5 message channel or an open TCP/IP port). In some implementations, the client device 104 sends input to the server 108 on a sending channel or sends a request with a rapid response (for example, a simple confirmation response) and also periodically polls the server 108 for updated models. For example, a model provided by the server may have a time to live or expiration time after which the client device 104 requests an updated model.

Generally, a model is a component that can be used by the client device 104 to process input received from the user interface 120 and, optionally, to modify information displayed by the user interface 120. (Models are described further below.) The client device 104 processes models it receives on the listening channel. In some implementations, the client device 104 authenticates the models it receives. A model may be authenticated using conventional means, for example, the server 108 may sign the model. The digital signature verifies that the model came from the server 108. In this implementation, the reception of the model is not necessarily paired with any particular transmission of an input.

In some scenarios, communications between the client device 104 and the server 108 can result in long latency. Latency refers to an amount of time that passes between when a user enters input into the user interface 120 and when the client device 104 provides feedback responsive to the input. When providing the feedback requires that the client device 104 communicate with the server 108, the latency includes an amount of time that elapses from the time when a request is sent by the client device 104 until the time when the client device 104 receives a response from the server 108. Long latencies can result from communications over a great distance, for example, a transatlantic request. Long latencies can also result from communications over slow networks such as a cellular network, wireless network, or a radio network, for instance. Long latencies may also result from server 108 overload. In some scenarios, server 108 may become overloaded with requests. Overloading may occur when there is a sudden burst of activity. For example, following an unexpectedly good or bad earnings report, stock quote requests may dramatically increase.

Acceptable latency varies depending on the activity. For example, a user may be willing to wait a few seconds to send an email, but may expect almost immediate response between a keystroke and when the user interface acknowledges the keystroke (for example, when the character corresponding to the pressed key appears on the display). To accommodate the user's performance expectations, the user interface 120 integrates with a model on the client device 104. In some implementations, a model is a software component which contains information and processing instructions required to achieve functionality on the client. Client-side functionality does not require the client device 104 to communicate with the server 108 and, therefore, is not subject to latency due to network communications. Further, moving functionality into a client device 104 eases the workload of the server 108 and reduces latency due to overloading.

In some implementations, the model is executable code in a scripting language, for example, JAVASCRIPT, or an object which conforms to a particular application programming interface (API), for example a JAVA class file. In other implementations, the model is a data structure containing information which enables the model's functions. For example, the model may include regular expressions used to parse the input.

In some implementations, the model provides for latency sensitive functionality. In general, functionality which is performed on the client device 104 is referred to as client-side functionality, while functionality which is performed on the server 108 is referred to as server-side functionality. Some examples of latency sensitive client-side functionality may include data validation and presentation.

The ability of the client device 104 to support client-side functionality may be constrained by technical resources of the client device 104. Compared to server systems, client devices can have limited memory and processing power. The limitations of the client device 104 coupled with the latency in communication between the client device and the server can make sending the models necessary to perform all operations on the client device impractical.

The ability of the client device 104 to support client-side functionality may also be constrained by security and privacy concerns. Models can be used to limit the amount of data that is available to the client device. For example, performing an action on a user's bank account may require downloading some information, such as the current balance; however, does not require downloading stock holdings, recent transactions, etc. To provide better privacy, the client device may receive a model which only contains information pertaining to the user's balance. Later, if the user wishes to perform operations which require access to stock holdings, recent transactions, etc. a new model is associated with the client device.

The server 108 contains models 112, 114, 116, 118 which include information necessary to implement client-side functionality. Based on input 110 entered into the user interface 120 and sent to the server 108, software executing on the server 108 determines the appropriate model and sends that model (e.g., 114) to the client. In some embodiments, software executing on the client device 104 replaces a currently used model with the most recently received model. For example, the client replaces a web search model 106 with the basic email model 114. In some implementations, the client device may maintain a list of one or more potential models. The client device maintains a current model which the client device 104 uses for processing and may also maintain one or more backup models. For example, the client device may maintain a generic baseline model to replace any specialized model once the requested activity is complete.

Figure 2:
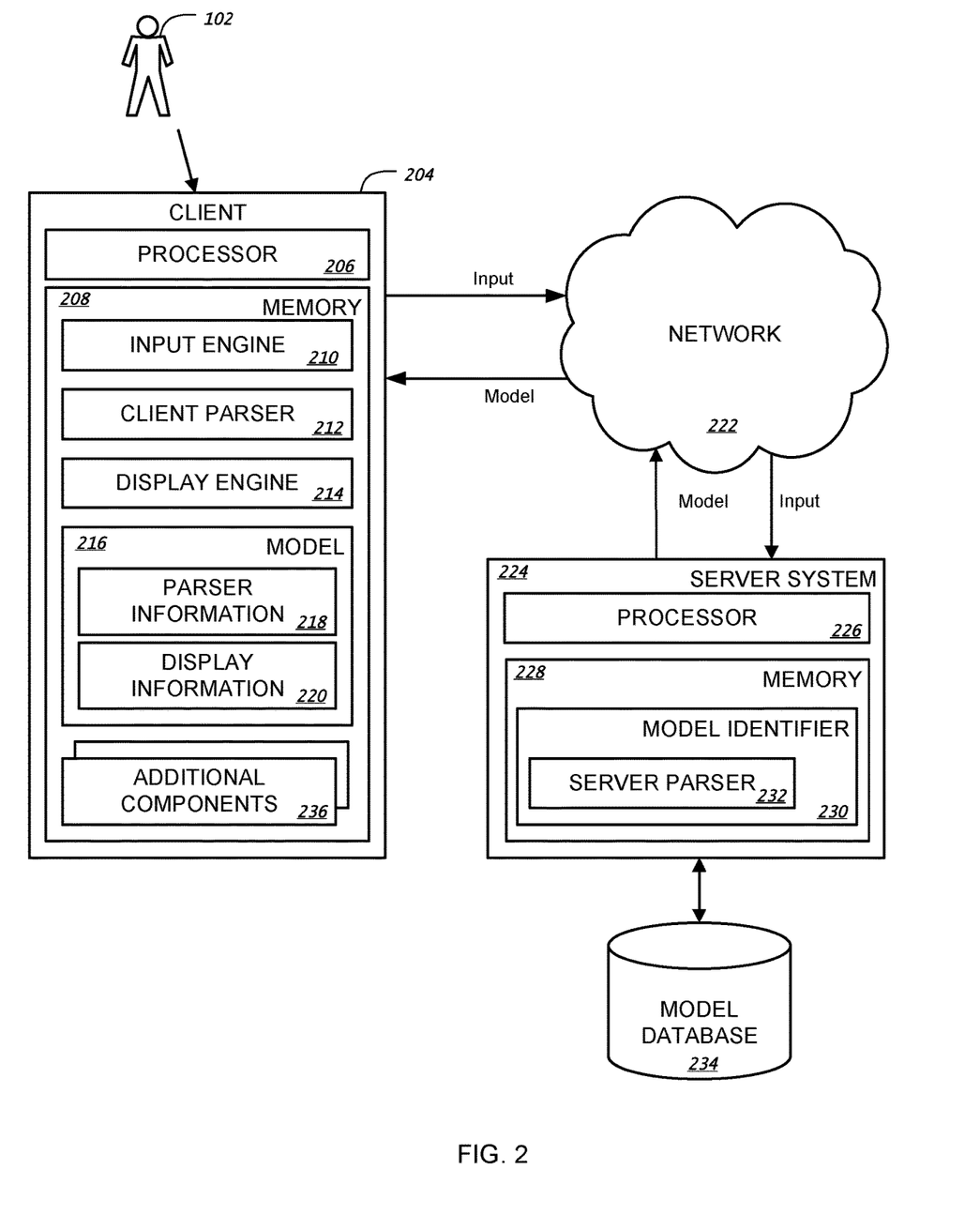
FIG. 2 illustrates an example system for providing models to a client device.

FIG. 2 illustrates an example system for providing models to a client device. A user 102 interacts with the client device 204 (e.g., a data processing apparatus) which includes a processor 206, such as a microprocessor, and a memory 208. The client device 204 provides a user interface which accepts input from the user. Within the memory 208 are various software components (e.g., executable instructions) including an input engine 210, which accepts input from the user interface; a client parser 212, which parses the input; a display engine 214, which displays the parsed input along with errors and other information pertaining to the parsed input; and a model 216. The user input can be typed text or speech converted to text, for example. The processor 206 is configured to execute the instructions for the software components that reside in the memory 208.

The model 216 includes parser information 218, which instructs the client parser 212 how to parse the user input. In some implementations, the parser information 218 includes one or more regular expressions which are applied to the user input by the client parser 212.

Generally, a regular expression is written in a formal language and specifies one or more character string patterns. Regular expressions can be used to determine if a given user input matches any of the string patterns specified by the regular expression, for example. The model also includes display information 220, which instructs the display engine how to display the parsed input. The display information 220 may also instruct the display engine 214 to present errors and other information based on the user input. For example, the parser information 218 in an email model contains information to instruct the client parser 212 to accept a user input "email someone@email.com Greeting Let's get together soon" and identify "someone@email.com" as an address, "Greeting" as a subject line, and "Let's get together soon" as a message body. In this example, the display information can instruct the display engine to present a formatted email message. The instructions can include regular expressions. For example, the regular expression "(email)]\s+([a-zA-Z0-9_\.]+@[a-zA-Z0-9_\.]+)\s+([a-zA-Z0-9_]+)\s(.+)" parses an email string and assumes a single word subject. The regular expression "(email)]\s+([a-zA-Z0-9_\.]+@[a-zA-Z0-9_\.]+)\s+([a-zA-Z0-9_\s]+[\.$])\s(.+)" parses the email string allowing for multiple words in the subject but assumes the subject ends in a period. Other regular expressions may be used.

The model can parse the input and reformat it for display in a user interface. For example, the parsed email may be formatted using capture groups identified during parsing. For example, the parsed string "email someone@email.com Greetings Let's get together soon" may be formatted using the string "Compose Email\n To: $1\n Title: $2\n Body: $3" to produce the results.

Compose email
To: someone@email.com
Title: Greetings
Body: Let's get together soon If the string is not successfully parsed by the parser, a capture group is empty and an error is detected.

Other methods of parsing strings may be used. For example, the model may use any method of processing the input supported by a programming language. For example, in one implementation the model processes the input using simple lookup tables. In another implementation, the model processes the input using complex neuro linguistic programming analysis.

While receiving input from the user 102, the client device 204 can send the user input from the input engine 210, through a network 222, for example, the Internet, to a server system 224. In some implementations, the client device 204 sends the input after each character is entered by the user 102. In other implementations, the client device 204 sends the input after some number of characters are entered by the user (e.g., one, two or four characters). In some implementations, the client device 204 sends the input based on information specified in the model. For example, the client device 204 can send input each time the user enters a complete word or in response to the client parser 212 being unable to apply the parser information 218 to the input. In some implementations, the client device 204 sends the input to the server system 224 based on a combination of the above criteria. For example, the client device 204 may send the input after four letters have been entered by the user, after a complete word has been entered by the user, and in response to the client parser 212 being unable to apply the parser information to the input.

The server system 224 receives the input from the client device 204. The server system 224 includes a processor 226 and a memory 228. The memory 228 includes a model identifier 230, which includes a server parser 232. The processor 226 is configured to execute instructions in memory 228 for performing the operations of the model identifier 230 and server parser 232. In some implementations, the server parser 232 may be separate from the model identifier 230. The model identifier 230 receives the input sent from the client device 204 and processes the input using the server parser 232. The model identifier 230 uses the parsed input to select an appropriate model stored in a model database 234. In some implementations, the server parser 232 applies multiple expressions to the input and determines the appropriate model based on which expressions can successfully parse the input. For example, if the input is "email someone@email.com Greeting Let's get together soon" then an expression which expects the words "stock quote" followed by a ticker symbol could not parse the input. In contrast, an expression which expects the word "email" followed by an email address, a one word subject, and body input would be able to successfully parse the input. In some implementations, the expressions are regular expressions.

In some implementations, the expressions and corresponding models are organized into a hierarchy to determine which model is returned to the client device 204 when the input can be parsed by two or more expressions.

In some implementations, the model 216 can interact with additional components 236 located on the client device 204. For example, a model can look up entries in a calendar on the client device or look up contacts in an address book on the client device. The model 216 uses this information in conjunction with the display information 220 to modify the display on a client device. For example, if a user is attempting to set up an appointment which conflicts with a previously scheduled appointment the display of the client device 204 can display a warning message. If a user is attempting to enter in an email address into the user interface of the client device, the model may obtain suggested email address completions from the user's address book on the client device which are displayed to the user.

In some implementations, models are provided by the server 224 only when the server 224 determines that the client device 204 is likely to experience long latencies. For example, if a location of the client device 204 is far from the server system 224 then the server system 224 provides the models. The location of a client device 204 can be derived using conventional means. For example, the location of the client device 204 can be derived from the Internet Protocol (IP) address of the client device 204. Other circumstances which can cause the server system 224 to provide models include, for example, identifying that the client device 204 is communicating over a mobile network. The server 224 can detect that a client device 204 is on a wireless network based on either the IP address of the client device 204 or from other information provided by the client device 204 (e.g. a user-agent header in an HTTP Request can indicate that the device is a mobile device and therefore likely to be communicating over a wireless network.) In some implementations, the server 224 provides a model to the client device 204 when the server is experiencing high utilization. In contrast, the server 224 may not provide a model when the server 224 is unable to determine an appropriate model or if the model would require sending sensitive information over an insecure communication channel.

Figure 3:
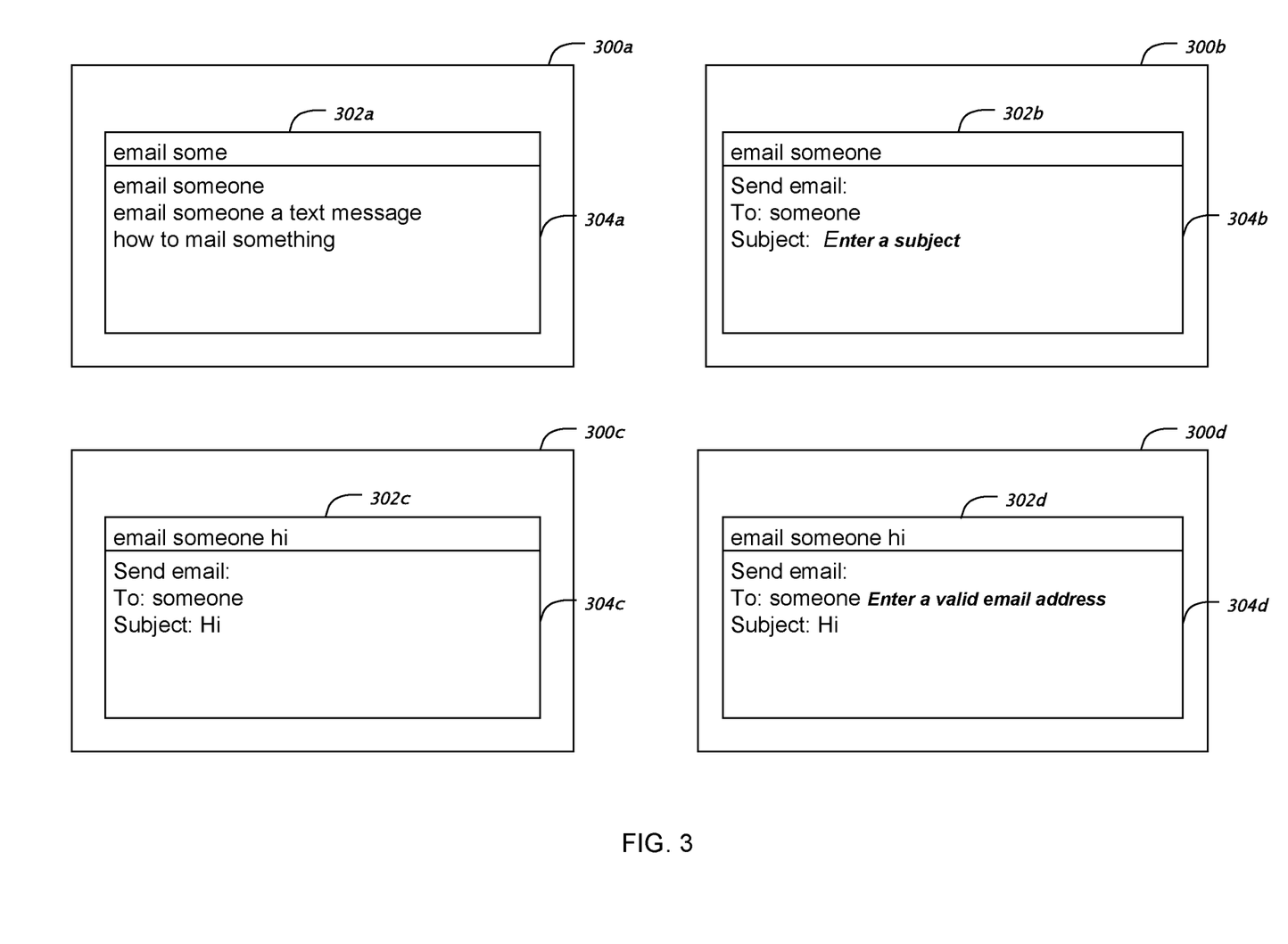
FIG. 3 illustrates examples of several states of a user interface as a user enters input.

FIG. 3 illustrates examples of several states of a user interface as a user enters input. The user interface executes on a client device, for example the client device 204 from FIG. 2. In the first state, a user interface 300a includes an input field 302a. The user has entered the input "email some." In this state, the user interface 300a is associated with a search model (not shown) and, consequently, displays suggested queries in a display area 304a.

The client device sends a communication to a server with the input "email some." The server determines that the user is attempting to compose an email based on the user input and sends a basic email model to the client.

The user continues to enter input into the input area 302b, for example, the client enters the additional characters "one"

(making the complete entry "email someone"). When the client receives the basic email model, the display area 304*b* is updated. For example, in the user interface 300*b* the display area 304*b* has been updated to reflect the determination that the user is composing an email message. The display area 304*b* identifies that the user has not entered a subject and, therefore, the display area 304*b* prompts the user for a subject.

In the next state, the user has entered more input into the input area 302*c* of the user interface 300*c*, "email someone hi". The display area 304*c* has been updated to reflect the additional input. In this state, the display area 304*c* does not reflect that the email address is invalid. The client sends the input to the server. The server determines that the client requires an advanced email model based on the input, and the advanced email model is sent to the client.

In the next state, the input area 302*d* has not changed on the user interface 300*d*. However, the display area 304*d* has been updated to identify that the email address is invalid. The display area 304*d* may format the error message in order to draw the user's attention to the error. For example, the error message "Enter a valid email address" may be displayed in a red font, may be underlined, or may be bolded.

Figure 4:
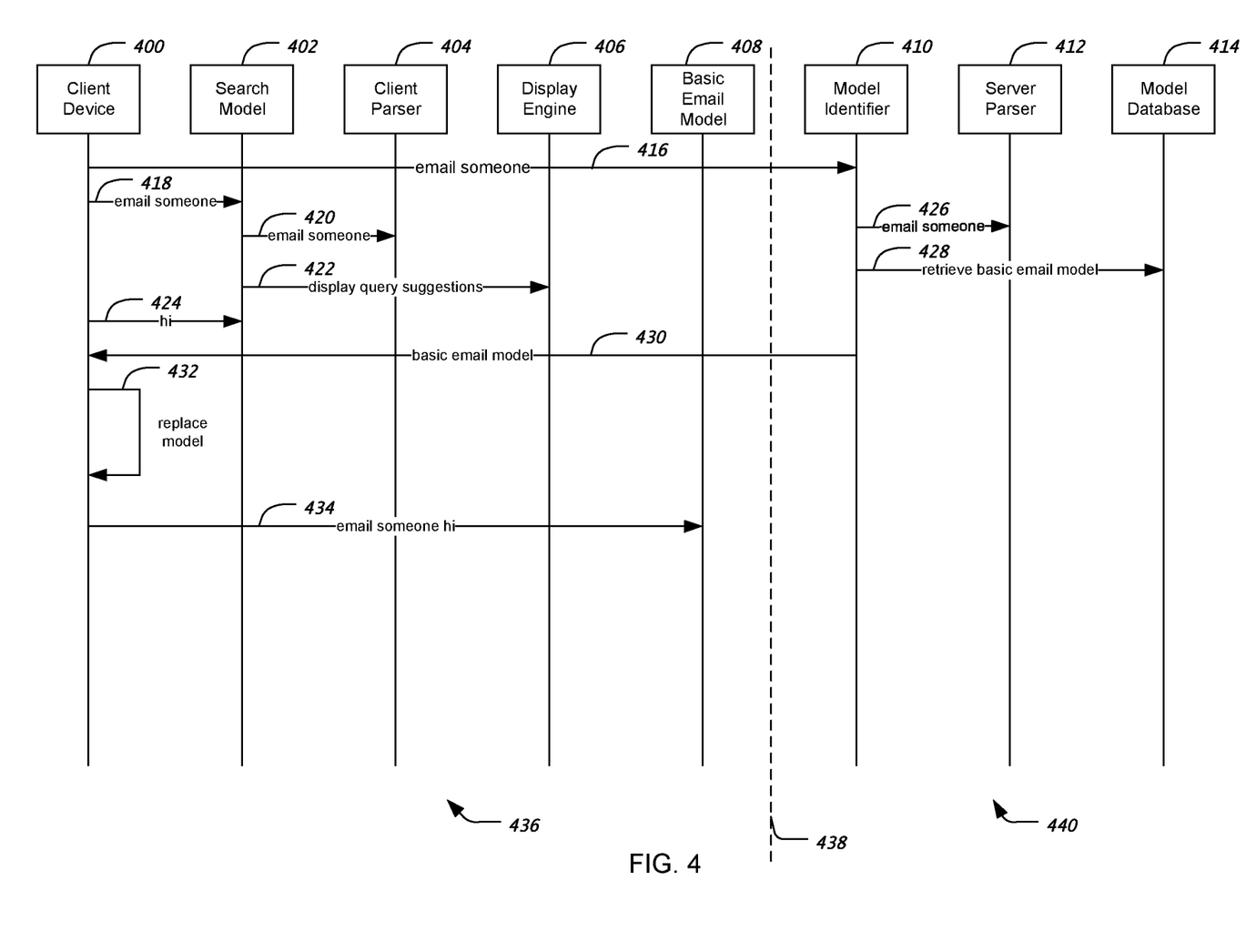
FIG. 4 is a sequence diagram illustrating an example technique whereby a client device receives an updated model from a server system based on a user entering input.

FIG. 4 is a sequence diagram illustrating an example technique whereby a client device 400 receives an updated model from a server system based on a user entering input. Components of the client device 400 are represented in the sequence diagram in the region on the left side 436 of the dotted line 438. Components on the server system are represented on the right hand side 440 of the dotted line 438. In this example, models include executable instructions (e.g. JAVASCRIPT instructions) which directly operate on components of the client device 400.

The client device 400 receives input from the user (not shown). Initially, the client device 400 is associated with a search model 402. In some implementations, the client device is initially associated with a generic model which serves as a placeholder until appropriate specific model is identified (e.g. a search model, a basic e-mail model, an advanced e-mail model, etc.) The client device 400 may be, for example, the client device 204 described in FIG. 2. In response to receiving the input "email someone", the client device 400 sends a request 416, including the entered input, to a model identifier 410 running on a server (for example, the server system 224 described in FIG. 2). In some implementations, the client device 400 sends the input to the model identifier 410 after each key stroke, after every 2 to 5 key strokes, or after each word. In some implementations, the complete input is sent with each message. In other implementations, the input is sent incrementally.

The client 400 also requests 418 search model 402 process the input "email someone". The search model 402 requests 420 the client parser 404 parse the input. The client parser 404 parses the input using parser information from the search model 402. The search model 402 then requests 422 the display engine 406 display query suggestions based on the parsed input and display information from the search model 402.

In this example, the user enters additional input "hi." The client device 400 requests 424 the search model 402 process the input "hi." In some implementations, the client device 400 sends the complete phrase "email someone hi" to the search model 402.

At the same time, the model identifier 410 requests a server parser 412 process the input. Based on the results from the parser, the model identifier 410 determines that the input is likely an email composition and retrieves 428 the basic email model 408 from a model database 414. The model identifier 410 sends 430 the basic email model to the client device 400.

The client device 400 replaces 432 the search model 402 with the basic email model 408. The client device 400 then requests the basic email model 408 process 434 the input.

In some implementations, the basic email model 408 can include executable instructions which interact with other components of the client device, for example, the basic email model 408 can interact with a user's address book on a client device. The basic email model 408 can provide completion suggestions based on the content of the address book. For example, assume the user's address book contains entries for someone@email.com and someone_else@email.com, if the user enters "email someone hi" then the basic email model 408 can compare "someone" to the address book on the client device. As a result the basic email model 408 identifies someone@email.com and someone_else@email.com as potential recipients of the email and provides completion options to the user (e.g. in a drop down selection box).

Figure 5:
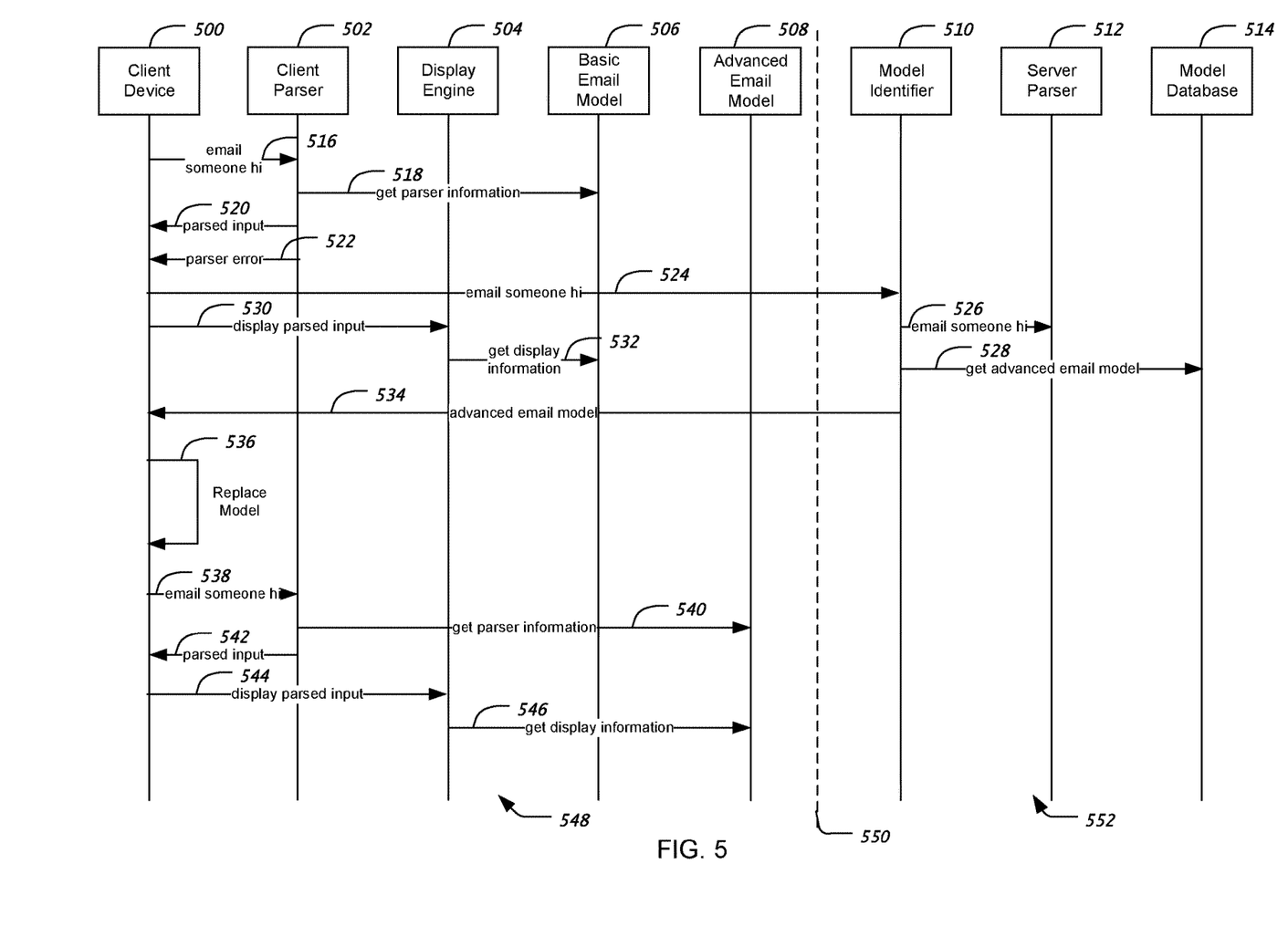
FIG. 5 is a sequence diagram illustrating an example technique whereby a client device receives a new model from a server system based on a failure to parse user entered input.

FIG. 5 is a sequence diagram illustrating an example technique whereby a client device 500 receives a new model from a server system based on a failure to parse user entered input. Components of the client device 500 are represented in the sequence diagram in the region on the left side 548 of the dotted line 550. Components on the server system are represented on the right hand side 552 of the dotted line 550. In this example, models include information that is used by components on the client device 500 to perform required functions.

The client device 500 receives input from the user (not shown). The client device 500 may be, for example, the client device 204 described in FIG. 2. The client device 500 is initially associated with a basic email model 506. The client device 500 requests a client parser 502 parse 516 the input "email someone hi". The client parser 502 obtains 518 the parser information from the basic email model 506. The client parser 502 then parses the input and returns 520 the parsed input to the client device 500. Along with the parsed input, the client parser 502 indicates 522 that an error occurred while parsing the input.

In response to the indication that an error occurred while parsing the input, the client device 500 sends a request 516, including the entered input, to a model identifier 510 running on a server (for example, the server system 224 described in FIG. 2). In some implementations, the client device 500 sends the input to the model identifier 510 after each key stroke, after every 2 to 5 key strokes, or after each word in addition to or instead of sending a request in response to a parsing failure. The client device 500 then requests 530 a display engine 504 display the parsed input. The display engine 504 obtains 432 the display information from the basic email model 506. The display engine 504 then presents a formatted display on the client device 500 based on the display information.

At the same time, the model identifier 510 requests 526 a server parser 512 parse the input. The server parser 512 parses the input and returns results to the model identifier 510. Based on the results, the model identifier 510 determines that the input requires an advanced email model 508. The model identifier 510 retrieves 528 the advanced email model 508 from a model database 514. The model identifier returns 534 the advanced email model 508 to the client device 500.

The client device 500 replaces 536 the basic email model 506 with the advanced email model 508. The client device

500 requests the client parser 502 parse 538 the input "email someone hi". The client parser 502 gets 540 parser information from the advanced email model 540. The client parser 502 parses the input, using the parser information, and returns 542 the parsed input to the client device 500. At this point, no error is indicated.

The client device 500 then requests 544 that the display engine 504 display the parsed input. The display engine 504 obtains 546 the display information from the advanced email model 508. The display engine 504 then presents a formatted display on the client device 500 based on the display information.

Figure 6:
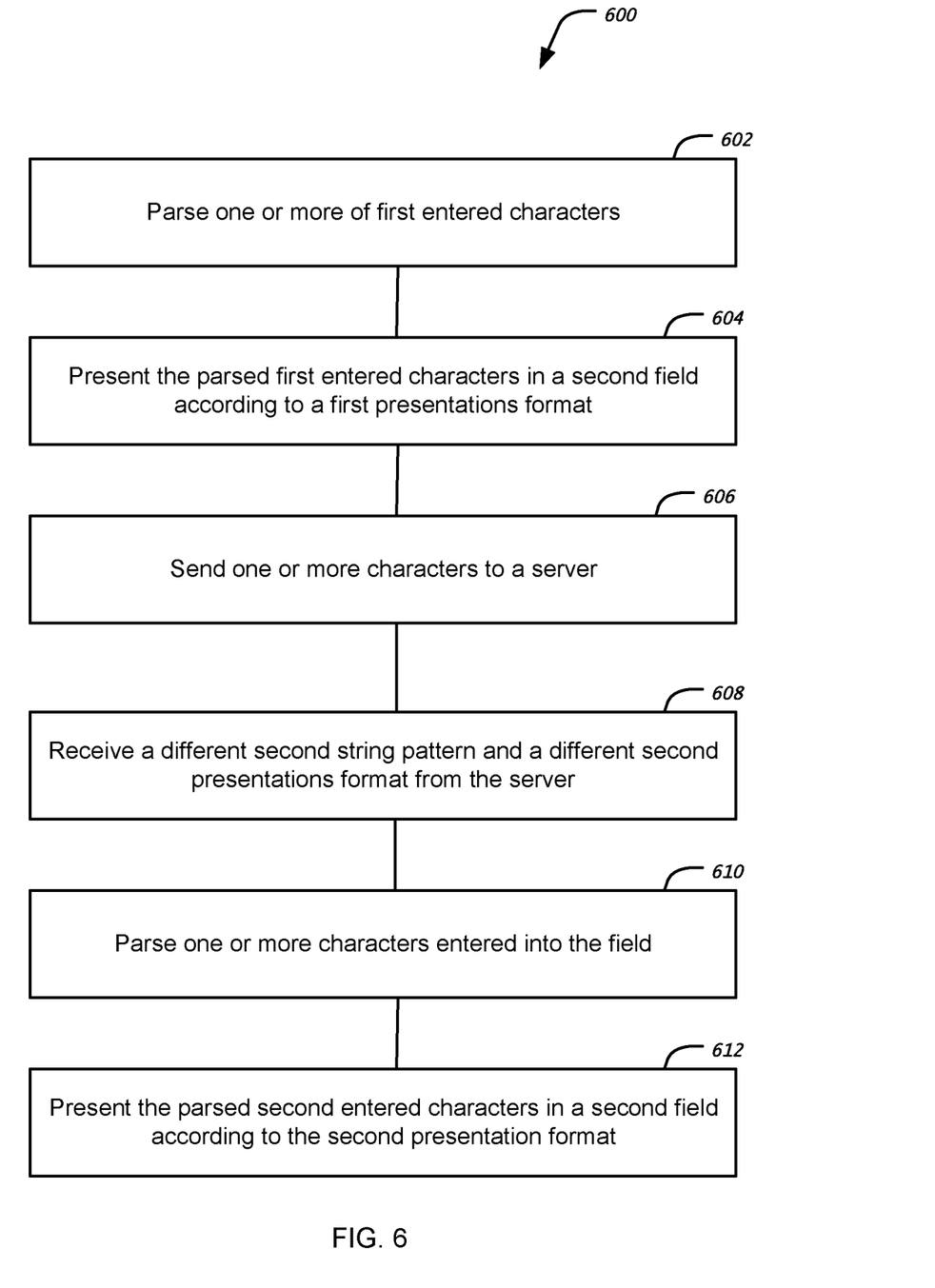
FIG. 6 is a flowchart showing an example process 600 for updating a model.

FIG. 6 is a flowchart showing an example process 600 for updating a model. The process will be described with reference to a system that performs the process 600. The system may be implemented on a client device, for example the client device 204 of FIG. 2.

The process is performed while individual characters in a sequence of characters are being entered into a first field of an interactive user interface and before the sequence has been completely entered. The text can be received, for example, as described above with reference to FIGS. 3, 4, and 5. The system parses one or more first entered characters (602). The system can parse the characters using a string pattern, for example, a regular expression.

The process presents the parsed first entered characters in a second field according to a first presentations format (604). For example, the process can present the parsed first entered characters in an interactive user interface, such as the user interface 300a including an input field 302a and display area 304a of FIG. 3. In some scenarios, the process adds labels and additional information, such as error messages, to the display.

The process sends one or more of the entered characters to a server (606). The one or more of the entered characters can be sent to the server using a request, such as an HTTP request or a User Datagram Protocol (UDP) message. In some implementations, the process can send the one or more of the entered characters to the server by accessing a dedicated port on the server or through an HTML5 message channel.

The process receives a different second string pattern and a display a different second presentations format from the server (608).

The process parses one or more second entered characters using the second string pattern (610).

The process then presents the parsed second entered characters in a second field according to the second presentation format. For example, the process can present the parsed second entered characters in an interactive user interface, such as the user interface 300a which includes an input field 302a and display area 304a of FIG. 3. In some implementations, the process adds labels and additional information, such as error messages to the display.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   providing, from a server to a client device, a first model specifying a first string presentation format and associated with a first string parsing pattern;
   receiving, at the server and from the client device, in response to a client device parsing error, first characters in a sequence of characters being entered into an input field of an interactive user interface displayed on the client device and before the sequence of characters has been completely entered, the first characters having been parsed using the first string parsing pattern associated with the first model to generate first parsed input, the first model specifying the first string presentation format that causes the client device to present the first characters in the sequence of characters in a first display format, and wherein the client device parsing error indicates that first characters cannot be parsed by the first string parsing pattern associated with the first model;
   parsing the first characters according to a plurality of string parsing patterns each associated with a respective model and string presentation format, each respective model is a respective software component that contains information and processing instructions required to achieve a functionality on the client device and executable by the client device, the processing instructions for each respective model including respective parsing instructions to instruct the client device to parse the first characters according to a particular parsing pattern, and wherein each parsing pattern for each respective model is different from each other parsing pattern for each other respective model;

determining, based on the parsing of the first characters according to the plurality of string parsing patterns, a second model from the respective models, the second model being different from the first model and associated with a second string parsing pattern and a second string presentation format that is different from the first string presentation format and that causes the client device, when executing the second model, to display the first characters in the sequence of characters in a second display format that is different from the first display format, wherein the second model is configured to address the error indicating that one or more first characters cannot be parsed by the first string parsing pattern associated with the first model by providing a message to enter a valid input of a particular type, and wherein the second string parsing pattern is different from the first string parsing pattern; and providing the second model to the client device for execution by the client device instead of the first model.

2. The computer implemented method of claim 1, wherein the plurality of string parsing patterns are regular expressions.

3. The computer implemented method of claim 2, wherein the first characters according to a plurality of string parsing patterns comprises parsing the first characters to identify capture groups.

4. The computer implemented method of claim 1, wherein the second model includes instructions that instruct how the client device is to display parsed input generated using the second string parsing pattern.

5. A non-transitory computer storage medium encoded with a computer program, the program comprising instructions that when executed by data processing apparatus cause the data processing apparatus to perform operations comprising:

providing, from a server to a client device, a first model specifying a first string presentation format and associated with a first string parsing pattern;

receiving, at the server and from the client device, in response to a client device parsing error, first characters in a sequence of characters being entered into an input field of an interactive user interface displayed on the client device and before the sequence of characters has been completely entered, the first characters having been parsed using the first string parsing pattern associated with the first model to generate first parsed input, the first model specifying the first string presentation format that causes the client device to present the first characters in the sequence of characters in a first display format, and wherein the client device parsing error indicates that first characters cannot be parsed by the first string parsing pattern associated with the first model;

parsing the first characters according to a plurality of string parsing patterns each associated with a respective model and string presentation format, each respective model is a respective software component that contains information and processing instructions required to achieve a functionality on the client device and executable by the client device, the processing instructions for each respective model including respective parsing instructions to instruct the client device to parse the first characters according to a particular parsing pattern, and wherein each parsing pattern for each respective model is different from each other parsing pattern for each other respective model;

determining, based on the parsing of the first characters according to the plurality of string parsing patterns, a second model from the respective models, the second model being different from the first model and associated with a second string parsing pattern and a second string presentation format that is different from the first string presentation format and that causes the client device, when executing the second model, to display the first characters in the sequence of characters in a second display format that is different from the first display format, wherein the second model is configured to address the error indicating that one or more first characters cannot be parsed by the first string parsing pattern associated with the first model by providing a message to enter a valid input of a particular type, and wherein the second string parsing pattern is different from the first string parsing pattern; and providing the second model to the client device for execution by the client device instead of the first model.

6. The non-transitory computer storage medium of claim 5, wherein the plurality of string parsing patterns are regular expressions.

7. The non-transitory compuer storage medium of claim 6, wherein ther first characters according to a plurality of string parsing patterns comprises parsing the first characters to identify capture groups.

8. The non-transitory computer storage medium of claim 5, wherein the second model includes instructions that instruct how the client device is to display parsed input generated using the second string parsing pattern.

9. A system comprising:

a processor;

a memory sub-system communicatively coupled to the processor and having instructions stored thereon, that, when executed by the processor, cause the processor to perform operations comprising:

providing, from a server to a client device, a first model specifying a first string presentation format and associated with a first string parsing pattern; receiving, at the server and from the client device, in response to a client device parsing error, first characters in a sequence of characters being entered into an input field of an interactive user interface displayed on the client device and before the sequence of characters has been completely entered, the first characters having been parsed using the first string parsing pattern associated with the first model to generate first parsed input, the first model specifying the first string presentation format that causes the client device to present the first characters in the sequence of characters in a first display format, and wherein the client device parsing error indicates that first characters cannot be parsed by the first string parsing pattern associated with the first model;

parsing the first characters according to a plurality of string parsing patterns each associated with a respective model and string presentation format, each respective model is a respective software component that contains information and processing instructions required to achieve a functionality on the client device and executable by the client device, the processing instructions for each respective model including respective parsing instructions to instruct the client device to parse the first characters according to a particular parsing pattern, and wherein each parsing pattern for each respective model is different from each other parsing pattern for each other respective model;

determining, based on the parsing of the first characters according to the plurality of string parsing patterns, a second model from the respective models, the second model being different from the first model and associated with a second string parsing pattern and a second string presentation format that is different from the first string presentation format and that causes the client device, when executing the second model, to display the first characters in the sequence of characters in a second display format that is different from the first display format, wherein the second model configured to address the error indicating that one or more first characters cannot be parsed by the first string parsing pattern associated with the first model by providing a message to enter a valid input of a particular type, and wherein the second string parsing pattern is different from the first string parsing pattern; and providing the second model to the client device for execution by the client device instead of the first model.

10. The system of claim 9, wherein the plurality of string parsing patterns are regular expressions.

11. The system of claim 10, wherein the first characters according to a plurality of string parsing patterns comprises parsing the first characters to identify capture groups.

12. The system of claim 9, wherein the second model includes instructions that instruct how the client device is to display parsed input generated using the second string parsing pattern.

* * * * *

UNITED STATES PATENT AND TRADEMARK OFFICE
CERTIFICATE OF CORRECTION

Page 1 of 1

PATENT NO. : 10,769,367 B1
APPLICATION NO. : 15/076168
DATED : September 8, 2020
INVENTOR(S) : Tomer Kol It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*